United States Patent [19]

Majer

[11] 4,392,593
[45] Jul. 12, 1983

[54] COFFEE POWDER METERING DEVICE FOR COFFEE VENDING MACHINES

[75] Inventor: Carlo D. Majer, Caronno Pertusella, Italy

[73] Assignee: Rhea Vendors S.r.l., Caronno Pertusella, Italy

[21] Appl. No.: 244,680

[22] Filed: Mar. 17, 1981

[30] Foreign Application Priority Data

Mar. 27, 1980 [IT] Italy .............................. 20957 A/80

[51] Int. Cl.³ ............................................ B65D 88/54
[52] U.S. Cl. .................................... 222/305; 222/350; 222/362; 221/263; 221/270
[58] Field of Search ............... 222/361, 362, 305, 307, 222/216, 217, 517, 504, 344, 349, 350, 351, 345, 308, 309, 267, 215, 516, 222, 223, 363; 221/263, 233, 234, 247, 248, 270, 276, 279

[56] References Cited

U.S. PATENT DOCUMENTS

| | | | |
|---|---|---|---|
| 1,012,439 | 12/1911 | Rehsuss | 222/362 |
| 3,052,383 | 9/1962 | Transeau | 222/345 |
| 3,578,209 | 5/1971 | Fraser | 222/307 |
| 3,587,938 | 6/1971 | Brown | 222/350 |
| 3,754,688 | 8/1973 | Colvin | 222/362 |

*Primary Examiner*—Kenneth W. Noland
*Attorney, Agent, or Firm*—Birch, Stewart, Kolasch & Birch

[57] ABSTRACT

The present invention relates to a coffee powder metering device for coffee vending machines which, besides ensuring that all the coffee powder is metered out with no residue left behind, is also easy to manufacture.

The metering device comprises in a structure: a tubular main part, an end wall for closing off one end of the the tubular main part and a thrust wall in the tubular main part opposite the end wall. The tubular main part, end wall and thrust wall thus form a compartment for receiving a given quantity of coffee powder, through an inlet in one of the sides, and forcing it out through the end by utilizing the thrust wall. On the wall facing the compartment, the thrust wall is fitted with at least one movable lip held firmly by way of an elastic device against the tubular main part so as to scrape it clean.

7 Claims, 2 Drawing Figures

COFFEE POWDER METERING DEVICE FOR COFFEE VENDING MACHINES

BACKGROUND OF THE INVENTION

The present invention relates to a coffee powder metering device for coffee vending machines comprising in a structure: a tubular main part, formed by two opposite side panels and two walls, perpendicular to the side panels; an end wall for closing off one end of the tubular main part, opened by power means; and a thrust wall inside the tubular main part, opposite the end wall and set at an adjustable distance from the end of the tubular main part towards which it is moved by control means. The tubular main part, end wall and thrust wall form a compartment for receiving a given quantity of coffee power, through an inlet in one of the sides, and forcing it out through the end by means of the thrust wall.

Although they offer a number of advantages from certain points of view, known metering devices currently being used all have the following drawback in common.

It is practically impossible to ensure that the thrust wall, which forces the coffee powder out as it slides down the tubular main part, mates perfectly all the way round with the tubular main part, the result is that, however small, at least part of the edge of the thrust wall does not contact the tubular main part.

Because of this gap, the thrust wall does not force out all the coffee powder in the compartment and a small amount, corresponding to the size of the gap, is left, on account of its oily nature, on the wall of the tubular main part.

The aim of the present invention is to provide a metering device designed structurally and functionally to overcome the defect of known systems.

SUMMARY OF THE INVENTION

The metering device of the present invention specified herein is characterised by the fact that, on the wall facing the compartment, the thrust wall is fitted with at least one movable lip held firmly by elastic means against the tubular main part so as to scrape it clean.

Furthermore, the thrust wall is provided with two lips facing the compartment and hinged together to form a V, each held firmly by elastic means against the respective wall of the tubular main part so as to scrape it clean.

BRIEF DESCRIPTION OF THE DRAWINGS

The invention will now be described with reference to the attached diagrams, provided by way of a non-limiting example, in which.

DESCRIPTION OF A PREFERRED EMBODIMENT

Figures 1, 2:
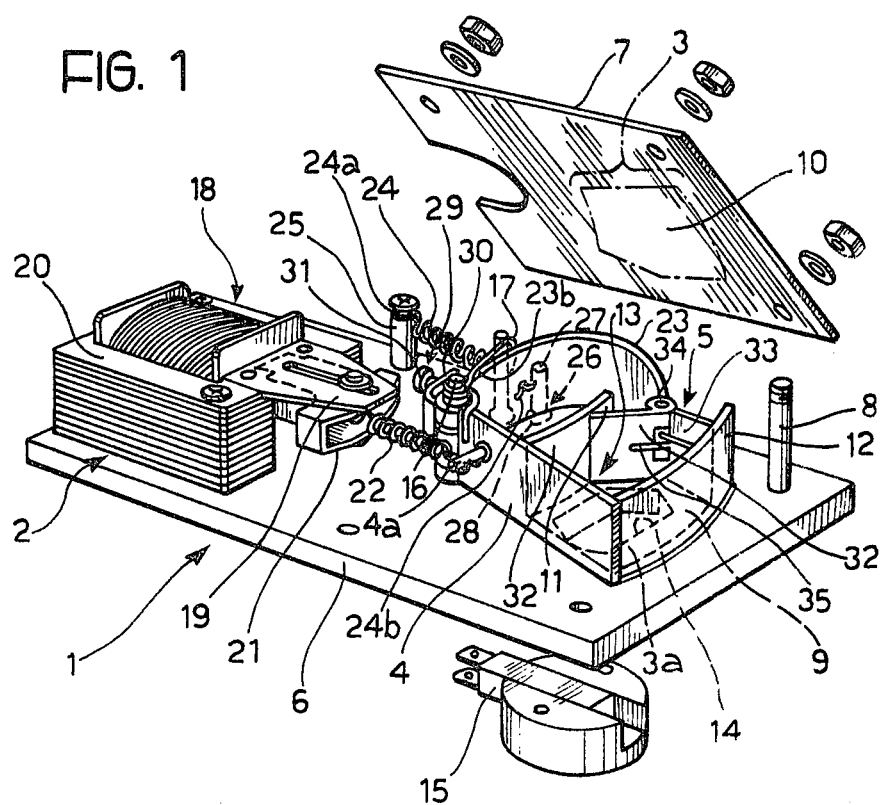
FIG. 1 shows a part section in perspective of a metering device, according to the present invention, during the first operating stage.
FIG. 2 shows the FIG. 1 metering device during the second operating stage.

Number 1 in the attached diagrams indicates an overall coffee powder metering device for coffee vending machines which is of the ordinary type and therefore not shown. The metering device 1 comprises on the structure 2: a tubular main part 3, an end wall 4 for closing off one end 3a of the tubular main part 3, opened by power means described later; a thrust wall 5 inside the tubular main part 3, an opposite end wall 4 and set at an adjustable distance from end 3a of the tubular main part 3 towards which it is moved by control means described later. Structure 2 consists of two parallel plates, 6 and 7, connected to each other by pins all marked by number 8. The tubular main part 3 is formed by two side panels, 9 and 10, which, in the example shown, consist of two portions of plates 6 and 7 and two walls, 11 and 12, perpendicular to the said side panels 9 and 10.

Tubular main part 3, end wall 4 and thrust wall 5 form a compartment, 13, for receiving a given quantity of coffee powder through inlet 14 in side panel 9 and for forcing it out through the end 3a by means of thrust wall 5, according to the set supply cycle. On the side panel 10, the tubular main part 3 is fitted with a known sensitive-membrane electric sensor, 15, positioned more or less facing inlet 14. End wall 4 rests on and swivels round pin 16, perpendicular to plates 6 and 7, and is fitted with a torsion spring, 17, which exerts constant pressure on the wall to keep it closed, and power means 18 is provided for opening it.

The power means 18 includes an electromagnet, 19, whose stator, 20, is fitted integral with structure 2 and whose keeper, 21, is tied to end wall 4 on projection 4a with a jerk spring, 22, inbetween. Thrust wall 5 is fitted to one end, 23a, of a moving arm, 23, which is hinged at the other end, 23b, to pin 16. Thrust wall 5 is kept well away from end 3a of tubular main part 3 by means consisting of spring 24, one end of which, 24a, is fitted to pin 25 in structure 2 while the other end, 24b, is fitted to arm 23. Spring 24 keeps arm 23 against adjustable stop 26 consisting of an ordinary pin, 27, assembled eccentrically on pin 28 on plate 6 so that it can be moved angularly for making the adjustment. The control means, 29, for moving wall 5 against the effect of the said elastic means, consist of projection 30 on wall 4 and screw 31, also on wall 4, which engages with arm 23 for turning it round when the end wall opens.

Adjustment screw 31 is set so as to engage arm 23 after the end wall has turned by a preset amount.

On metering device 1, according to the invention, thrust wall 5 is fitted with two lips, 32 and 33, facing the compartment and hinged to each other so as to form a V round pin 34 on end 23a of arm 23, each held firmly, by elastic means, consisting of spring 35, against either of walls 11 and 12 of the tubular main part 3 so as to scrape it clean.

The operation of the metering device according to the invention will now be described with reference to the initial condition shown in FIG. 1. In this condition, end wall 4 is closed over end 3a of tubular main part 3 while thrust wall 5 is at a preset distance from end 3a. By adjusting stop 26, this distance can be adjusted until the volume of compartment 13 corresponds to the required amount of coffee powder.

This is poured into compartment 13 through inlet 14 from an ordinary coffee grinder, for example, not shown in the diagram.

When the compartment is full of coffee, sensor 15 sends out a signal which cuts off supply of coffee to the compartment. Coffee is supplied from the compartment by energizing electromagnet 19 which directly controls angular displacement of end wall 4 which switches from closed to open. During the initial rotation stage, screw 31 moves forward to engage arm 23. For the remainder of rotation, the end wall is also angled by screw 31 so that end wall 5 moves towards end 3a of tubular main part 3 thus expelling the coffee powder from compartment 13. Lips 32 and 33 on wall 5 slide firmly along walls 11 and 12 so as to scrape them clean.

The main advantage of the metering device according to the present invention is that all of the coffee powder is metered out without leaving any on the wall of the tubular main part. A further advantage of the metering device according to the present invention is that the walls of the tubular main part need not necessarily be exactly parallel to the thrust wall or even to each other, a feature which provides for easy manufacture.

I claim:

1. Coffee powder metering device for coffee vending machines comprising in a structure:
   a tubular main part, formed by two opposite side panels and two walls, perpendicular to said side panels;
   an end wall for closing off one end of the tubular main part, opened by power means;
   a thrust wall inside said tubular main part, opposite the end wall and set at an adjustable distance from said end of the tubular main part, said thrust wall is moved by control means;
   said tubular main part, end wall and thrust wall form a compartment for receiving a given quantity of coffee powder, through an inlet in one of the side panels, and forcing it out through said end by means of the thrust wall, wherein on the two walls facing the compartment, the thrust wall is fitted with two lips facing the compartment, hinged to each other so as to form a V and each held firmly, by elastic means, against the respective walls of the two walls of the tubular main part so as to scrape it clean.

2. Metering device according to claim 1, wherein the end wall rests on and swivels round a pin and is fitted with a torsion spring, which exerts constant pressure on the end wall to keep it closed, and is moved by the said power means in opposition to the action of the said torsion spring.

3. Metering device according to claim 2, wherein the thrust wall is fitted to one end of an arm which is fitted at the other end to the said pin and held firmly against an adjustable stop well away from the end of the tubular main part by elastic means and moved by the said control means in opposition to the action of the said elastic means.

4. A metering device according to claim 3, wherein said arm is a curved arm rotatably mounted to said pin.

5. A metering device according to claim 3, wherein said end wall includes a projection and said control means includes a screw adjustably mounted in said projection, said screw engages said arm to adjust the distance of the arm from the end of the tubular main part and for moving said arm and said thrust wall about said pin.

6. A metering device according to claim 1, wherein said power means includes an electromagnet having a stator affixed to said structure and a keeper secured to said end wall.

7. A metering device according to claim 1, wherein said two walls are curved and substantially parallel with respect to each other.

* * * * *